(12) United States Patent
George et al.

(10) Patent No.: US 12,265,557 B2
(45) Date of Patent: Apr. 1, 2025

(54) LEARNING-BASED METHOD FOR GENERATING VISUALIZATIONS VIA NATURAL LANGUAGE

(71) Applicant: Adobe Inc., San Jose, CA (US)

(72) Inventors: William Brandon George, Pleasant Grove, UT (US); Wei Zhang, Great Falls, VA (US); Tyler Rasmussen, San Jose, CA (US); Tung Mai, San Jose, CA (US); Tong Yu, Fremont, CA (US); Sungchul Kim, San Jose, CA (US); Shunan Guo, San Jose, CA (US); Samuel Nephi Grigg, Sandy, UT (US); Said Kobeissi, Lovettsville, VA (US); Ryan Rossi, San Jose, CA (US); Ritwik Sinha, Cupertino, CA (US); Eunyee Koh, San Jose, CA (US); Prithvi Bhutani, Lynnwood, WA (US); Jordan Henson Walker, Lehi, UT (US); Abhisek Trivedi, South Jordan, UT (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/459,081

(22) Filed: Aug. 31, 2023

(65) Prior Publication Data
US 2025/0077549 A1  Mar. 6, 2025

(51) Int. Cl.
*G06F 40/00* (2020.01)
*G06F 16/242* (2019.01)
(Continued)

(52) U.S. Cl.
CPC .......... *G06F 16/287* (2019.01); *G06F 16/243* (2019.01); *G06F 40/205* (2020.01); *G06F 40/40* (2020.01)

(58) Field of Classification Search
CPC .... G06F 16/287; G06F 16/243; G06F 40/205; G06F 40/40
See application file for complete search history.

(56) References Cited

U.S. PATENT DOCUMENTS

| | | | |
|---|---|---|---|
| 11,189,269 B2 * | 11/2021 | Tan | G06F 40/205 |
| 11,314,786 B1 * | 4/2022 | Setlur | G06T 11/206 |
| 2020/0134103 A1 * | 4/2020 | Mankovskii | G06F 40/56 |

OTHER PUBLICATIONS

A. Narechania et al., "NL4DV: A Toolkit for Generating Analytic Specifications for Data Visualization from Natural Language Queries", IEEE Transactions on Visualization and Computer Graphics, https://www.tableau.com/sites/default/files/2023-01/nl4dv-vis20.pdf (accessed Sep. 1, 2023) (11 pages).

(Continued)

*Primary Examiner* — Tuankhanh D Phan
(74) *Attorney, Agent, or Firm* — Shook, Hardy & Bacon L.L.P.

(57) ABSTRACT

Graphic visualizations, such as charts or graphs conveying data attribute values, can be generated based on natural language queries, i.e., natural language requests. To do so, a natural language request is parsed into n-grams, and from the n-grams, word embeddings are determined using a natural language model. Data attributes for the graphic visualization are discovered in the vector space from the word embeddings. The type of graphic visualization can be determined based on a request intent, which is determined using a trained intent classifier. The graphic visualization is generated to include the data attribute values of the discovered data attributes, and in accordance with the graphic visualization type.

15 Claims, 9 Drawing Sheets

(51) Int. Cl.
  *G06F 16/28* (2019.01)
  *G06F 40/205* (2020.01)
  *G06F 40/40* (2020.01)

(56) References Cited

OTHER PUBLICATIONS

Vega-Lite Overview, https://vega.github.io/vega-lite/docs/format.html (accessed Sep. 1, 2023) (7 pages).

* cited by examiner

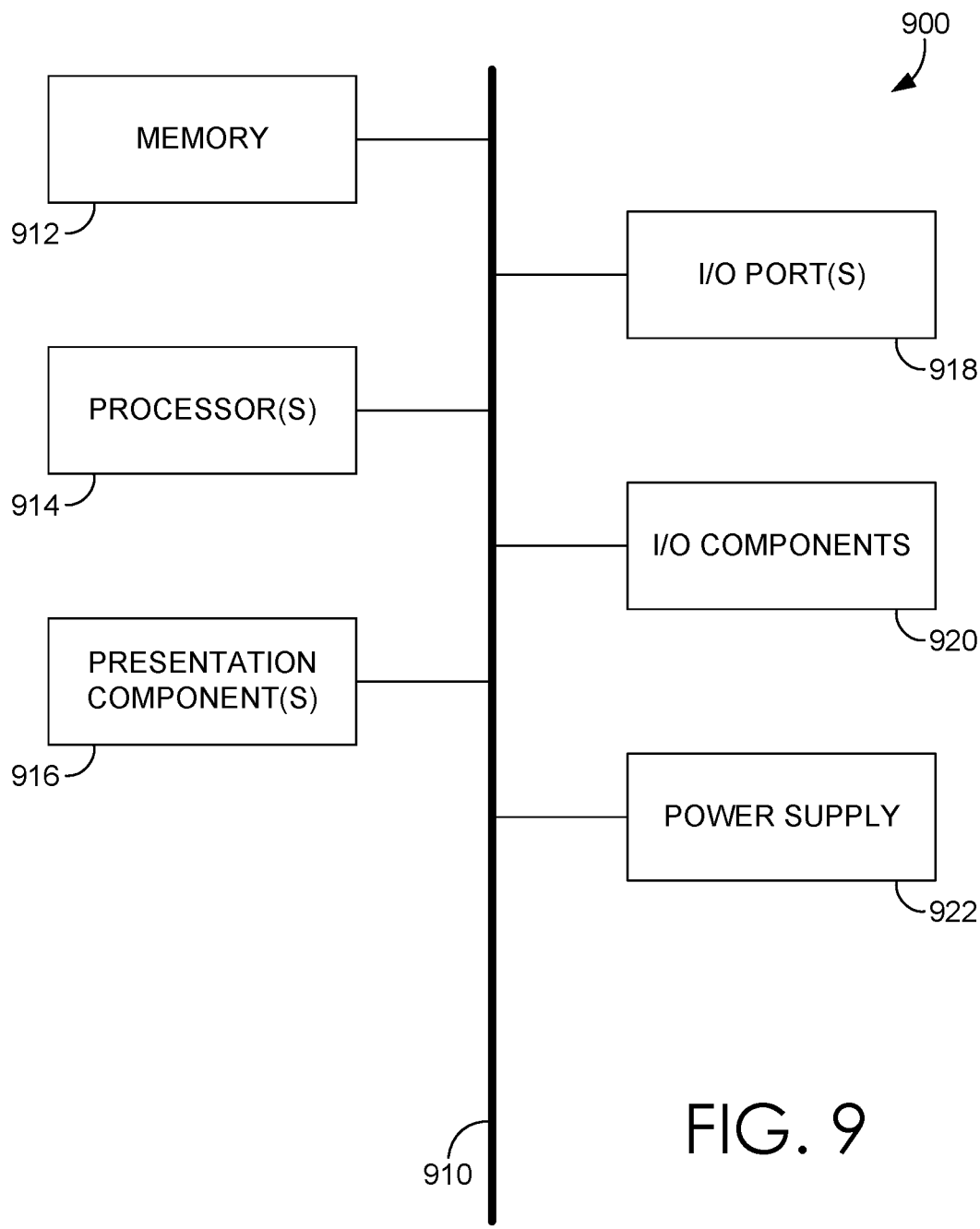

LEARNING-BASED METHOD FOR GENERATING VISUALIZATIONS VIA NATURAL LANGUAGE

BACKGROUND

Graphic visualizations, such as charts and graphs, illustrate data in an easy-to-digest form. Graphic visualizations can be manually created with software programs by selecting data values and instructing the program on how to graphically represent the data.

SUMMARY

Graphic visualizations include graphs and charts that convey data. Typically, these are created in software programs by expressly identifying the data attributes to be included on the graphic visualization and identifying the exact graphic visualization type. The technology provided here describes generating graphic visualizations from natural language queries, i.e., a natural language request.

To do so, a natural language model is trained on a corpus of documents that includes text-based information corresponding to graphic visualizations. The text-based information includes data attributes of the graphic visualizations. An intent classifier can also be trained. The intent classifier is trained using labeled intent pairs. The labeled intent pairs include a text phrase associated with an intent label identifying a known intent of the text phrase.

When a natural language request is received, the natural language request is parsed into n-grams. All or a portion of the n-grams can be provided as inputs to the natural language model, which outputs word embeddings. The word embeddings are used to discover data attributes in a common vector space based on a vector similarity between the word embeddings and corresponding data-attribute embeddings. The classifier can receive the natural language request as an input, and in response, determine the request intent. The request intent informs the graphic visualization type, which is the type of graphic visualization that can represent the data attribute values graphically. A graphic visualization is then generated to include the data attribute and in accordance with the graphic visualization type.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIG. 9 illustrates an example computing device suitable for implementing aspects of the technology, in accordance with an aspect described herein.

DETAILED DESCRIPTION

Definitions

Figure 1:
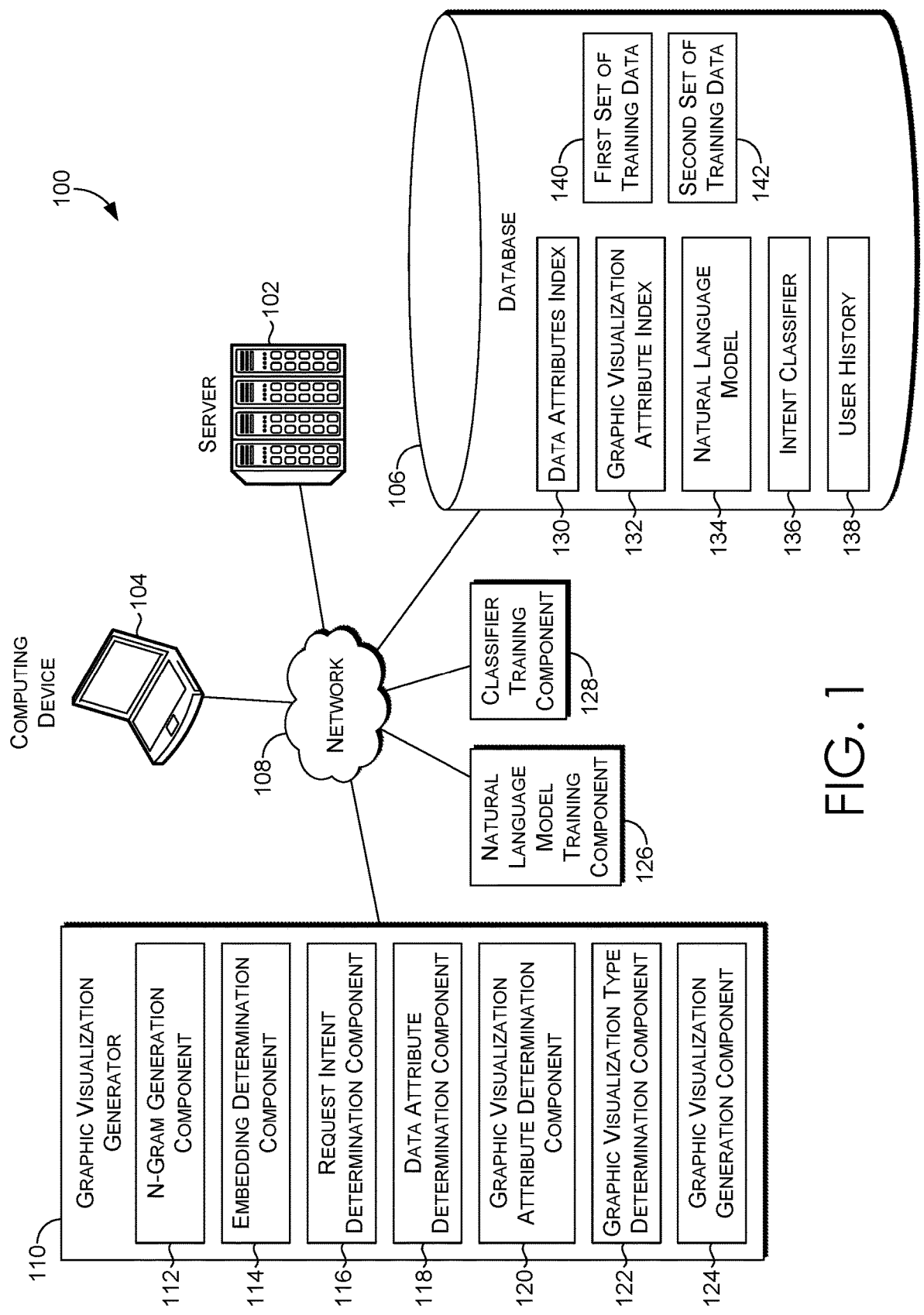
FIG. 1 illustrates an example operating environment for a graphic visualization generator, in accordance with an aspect described herein.

Various terms are used throughout this description. Definitions of some terms are included below to provide a clearer understanding of the ideas disclosed.

As used herein, "data attribute" generally describes an attribute of data that includes data values for that attribute. An "attribute" refers to a specific data item or field that describes a characteristic or property of an entity. It represents a particular aspect or piece of information related to the entities within the database. Data values attributed to the attribute can be described as being within a domain for that data attribute. In the context of a database, a domain refers to the set of all possible values that an attribute can hold. It defines the range of valid data that can be stored in a particular attribute. For example, if you have an attribute "Gender," the domain for this attribute could be limited to two values: "Male" and "Female." Using another example, an attribute like "Age" would have a domain that includes all possible valid ages of students, which typically range from, let's say, 18 to 100 years.

As used herein, an "embedding," in the context of machine learning and natural language processing (NLP), generally refers to a numerical representation of data, typically used to transform categorical or discrete data into a continuous vector space. Embeddings are commonly employed to represent words, sentences, or entire documents in a way that captures their semantic meaning and relationships. Thus, a "data attribute embedding" as used throughout this disclosure is a numerical representation of a data attribute. For example, consider a categorical attribute "Country," which can take values like "USA," "Canada," "Germany," etc. Here, an embedding can represent each country as a continuous vector of real numbers. The embedding might map "USA" to [0.2, 0.8], "Canada" to [−0.4, 0.6], and "Germany" to [−0.6, −0.2]. These vectors would be chosen such that similar countries have embeddings that are closer in the vector space. Data attribute embedding may be learned by training a natural language model.

As used herein, "graphic visualization" generally refers to the presentation of data through the use of visual elements, such as charts, graphs, and other graphical representations, to illustrate and communicate the values of one or more data attributes. This form of data visualization aims to make complex information more accessible, comprehensible, and insightful to viewers by leveraging the power of visual cues and patterns.

As used herein, "graphic visualization attributes" generally refers to the specific graphical properties or characteristics used to represent data values visually. These attributes are applied to graphical elements, such as bars, lines, points, shapes, or areas, to encode the data values in a way that can be perceived and interpreted by viewers. They may help viewers distinguish between data categories, identify patterns, trends, and relationships, and make comparisons between different data points. Some example graphic visualization attributes include, but are not limited to, position, size, color, shape, texture, opacity, orientation, line style, labeling, angle, connection/link, density, saturation, border or outline, motion or animation, data attribute labels, stacking, grid lines, background, and trend lines.

As used herein, a "graphic visualization attribute embedding" generally refers to a numerical representation of a graphic visualization attribute. For example, a bar chart representing sales data for different products and the graphic visualization attributes used are "color," "height," and "width" of the bars. Instead of storing the raw color names (e.g., "red," "blue," "green"), bar heights (e.g., 50, 30, 70), and bar widths (e.g., 20 px, 30 px, 25 px) as separate attributes for each bar, an embedding can be created to represent them numerically. The embedding might map "red" to [1, 0, 0], "blue" to [0, 1, 0], "green" to [0, 0, 1] for the color attribute, bar heights to their corresponding numerical values, and bar widths to their numerical values.

As used herein, "graphic visualization type" generally refers to a form of graphic visualization that can be used to illustrate one or more data attributes along with their corresponding data values. Graphic visualizations come in various "types," such as bar charts, line charts, pie charts, scatter plots, heatmaps, area charts, bubble charts, treemaps, word clouds, and so forth.

As used herein, a "natural language request" generally refers to an input or query expressed in everyday human language, rather than a formal programming language or specific commands. It is a text-based expression that users use to communicate with a computer system, application, or virtual assistant in a way that is more conversational and intuitive. A natural language request may comprise words, phrases, sentences, or questions that are used to interact with a computer system or application. A natural language request may be in the form that mimics human communication.

As used herein, a "request intent" generally refers to an intent corresponding to the natural language request. An intent is the underlying purpose or meaning behind the natural language request, expressed in a textual form. It is a high-level representation of what the user wants to achieve or the task they are trying to perform by interacting with the computer system. For example, a request intent may capture desired features, such as a graphic visualization type, graphic visualization attribute, data attribute, or the like, even without language in the natural language request that explicitly conveys these features.

As used herein, "structured data element" generally refers to individual units or components of data that are organized and formatted in a consistent and well-defined manner, making it easy to process, store, and exchange data electronically. Structured data elements are typically part of structured data formats, such as JSON (JavaScript Object Notation), XML (Extensible Markup Language), CSV (Comma-Separated Values), and the like.

As used herein, "word embedding" generally refers to a numerical representation of words or phrases from a natural language vocabulary. It is a technique used to convert textual data, such as words, sentences, or documents, into dense vectors of real numbers in a continuous vector space. Word embeddings are designed to capture semantic relationships and context between words, allowing natural language models to process and understand natural language requests more effectively.

Overview

It is often difficult and time-consuming to analyze data and create visualizations using code or complicated UIs (user interfaces) with large drop-down menus and hidden options. It is often more natural and intuitive for a user to simply say what they want analyzed and visualized using natural language. The technology describe herein provides for a system that employs text-to-visualization generation, making it easy and fast for a user to simply say what they want visualized using natural language. At a high level, the system takes a natural language request, such as an input or text query, and generates one or more graphic visualizations in real-time for the user.

The system improves the ability to use natural language for graphic visualization generation, leading to better and faster understanding of data and improved decision making, among many others. Aspects of the system learn from past user behavior to make better and more accurate recommendations. Aspects of the system infer the intent of the natural language request as well as disambiguate it from other possibilities. This implicit user feedback can be used to recommend better visualizations with appropriate data and insights specifically tailored to the user. For instance, if the user typically prefers visualizations that compare a given metric to the metric time series from a week ago, then the system can leverage that implicit user feedback to recommend better visualizations and insights to the user, as well as to suggest better natural language requests as they type. Furthermore, if the user asks a vague or ambiguous question, then the system can leverage the recent implicit user feedback to better understand and respond to that specific question where the user is asking questions about the data.

Systems described herein for visualization generation and insight discovery have many advances over conventional technology in the field. Previous approaches, such as Tableau's ask data, require the user to carefully configure synonyms that the end user might use when querying the data. This is extremely time-consuming and costly for even datasets of moderate sizes, as well as those with data attributes (fields, columns) that are categorical with many possible values. It is extremely costly to require a data engineer to create lists of synonyms for every attribute and unique value in the dataset of interest. This additional synonym database further adds additional computational steps to the process, as it is used for query expansion. Even these additional computational steps may fail to accurately identify the intended data attribute if the database mapping does not include a particular synonym, or when there is overlap between synonyms. Furthermore, it is even more costly to maintain it, since new categorical attribute values can arise, as well as entirely new attributes.

Moreover, other conventional methods are unable to improve the customer experience through personalization. In contrast, aspects herein can naturally leverage previous user interactions such as the visualizations added to dashboard, metrics clicked on, the underlying task the user is interested in, and so on. For instance, suppose that a user more frequently visualizes the visits this month compared to last. This knowledge can be leveraged next time to appropriately recommend the user visualizations that they would find useful for decision making.

Further, aspects herein utilize predictive forecasting-based insights to further empower the user and improve decision making. For instance, given a natural language request such as "show me monthly visits vs. last month," the system may also provide the visits forecasted one month into the future as an additional insight and comparison point, such as by data extrapolation and use of a trend line when generating the graphic visualization. Such forecasting-based insights are very powerful decision-making tools users use when exploring the data values and attributes graphically through natural language.

Further advancements provided by the disclosed technology include task classification. Using an intent classifier, the system learns to automatically predict the task of interest to a user, i.e., the request intent. To do this, a model is trained using a training dataset of request-to-intent (also referred to as request-to-task) pairs. The trained model infers the appropriate task in real-time, i.e., the intent of the user as to the attributes of the graphic visualization to be generated. Note that by inferring the intent of the task, the system essentially determines the appropriate graphic visualization type and other attributes related to the request intent that also help resolve and inform other components of the system.

In some cases, many requests are underspecified, leading previous systems to return poor results. To handle this previous limitation, the technology described herein leverages previous interaction data of the users (if available), along with a fine-tuned visualization-oriented natural language model and the resulting embeddings to infer the missing information required to respond in a meaningful and useful fashion. In contrast, many conventional systems simply default to a specific chart type with certain attributes, or take some default behavior that is not very useful, simply ignoring the problem of underspecified inputs. Instead, the technology described herein can leverage historical user interactions like the charts, tasks, insights, and data, along with metrics most often utilized, and even take advantage of other users' historical interaction data (which is especially important for new users or when users have very little interaction data available) to train a model to learn the hidden relationships between such interactions. Hence, even when the user inputs requests that are of little actual use, the systems described herein can still infer the missing parts, and from this, recommend and generate the appropriate graphic visualizations.

Some aspects of the technology apply auto-completion for natural language requests. Auto-completion leverages historical user interaction data to recommend better natural language requests to the user based on the tasks, charts, insights, data attributes and so on that may be of specific interest to the user. This leads to an improved user experience by recommending to the user better suggestions that are more in line with what they are most interested in exploring and visualizing. This further provides a user with a preview of the data attributes and how those may be used, thus aiding the user in data exploration, i.e., providing the user with the ability to describe, and ultimately generate, graphic visualizations in such a way that they previously would not have understood the data and system to be capable of.

There have been a few recent visualization recommendations and visual analytic systems that allow users to query them using text. However, the queries specified by the users must be constructed using a small set of terminology (words) that is manually defined by domain experts. This small set of words that these systems look for is severely limited: what chart type to use, what attribute to use in the x-axis, color, and so on. These limitations make these systems impractical in real-world applications where users are unlikely to know exactly what they want to ask, nor the time it would take for the user to write the query in a form using a very restricted set of vocabulary. Hence, the non-experts that these are designed for are unable to use them effectively due to these issues.

One example conventional method is NL4DV. However, this approach has all the previously stated issues, as it simply syntactically matches words in a query, either exactly or using a string similarity measure, to a very small set of words having predefined actions, and thus is unable to handle natural language requests that may not even contain any of the predefined words used by NL4DV. Furthermore, the use cases where that approach can be applied is a very small subset of the ones that aspects herein naturally support by leveraging a natural language model to obtain low-dimensional embeddings of the words, their synonyms, context with other words, and so on. Thus, aspects provided herein are more practical due to their flexibility, and are able to support different use cases that conventional technology would otherwise not be able to handle, such as exploratory analysis.

Conventional methods have only used off-the-shelf NLP toolkits for query parsing, attribute, task, visualization, and intent detection. However, these toolkits are trained on NLP datasets and tuned for such tasks, and therefore often fail for visualization-based tasks since they do not adequately cover visualization elements such as marks, channel, encoding properties, and the like. Limited work has also focused on incorporating intelligent and data-driven insight recommendations into such NLP systems.

To overcome these issues, this technology presented herein proposes a learning system and approach that gives the flexibility to users to specify textual queries using vocabulary that they are most familiar with while avoiding the issues of existing systems that require users to input queries that match exactly or near exactly to a small set of predefined vocabulary (agreed upon by visualization experts, but not common users). More specifically, the technology leverages a visualization-specific language model and a general pre-trained language model that is trained on a more general corpus of documents in different components.

In an embodiment, a pre-trained natural language model is used to identify the visualization task and other parts of the natural language request that are visualization specific, such as graphic visualization attributes, e.g., color, size, and so on. Natural language requests may not even specify the graphic visualization type, but just language to explore, including the user intent. An example is "Connection between total revenue from jackets and T-shirts in Feb compared to July." A natural language model can be trained, including fine-tuned, using a collection of visualization and data insight-related web sites and documents, as well as past data questions and answers from the same user and other related users as well. Further fine-tuning can be performed using graphic-visualization-related documentation and manuals. Furthermore, if question-to-visualization data is not readily available, one can also leverage public data readily available from sites like stackoverflow or plot.ly, among others. Furthermore, one can also make continual use of previous queries made by users of the system to further improve the accuracy and utility of it, leading to higher quality responses in less time.

The language model is used to map the data attribute names from some arbitrary user-selected dataset, as well as the attribute values in those data attributes that may be relevant. In some cases, the user may not even include the data attribute, but may refer to words that are "semantically" similar (though not syntactically) to a categorical attribute value of an attribute (data field) in the dataset. For instance, suppose the name of a data attribute is "City," having attribute values like "Seattle," "San Jose," "Stanford," "Atlanta," and so on, and the user's query doesn't contain "City" or any synonym of it, but only the names of the cities. One example natural language request is: "Similarity of monthly jacket sales in Seattle and Atlanta." The natural language model is useful for words unrelated to visualization design and customization. For instance, the query mentions jacket sales, which is not syntactically similar to any attribute values under the "Product Categories" data attribute, but is a synonym of "coats," which is an actual attribute value.

There are many advantages to the technology. For instance, the technology makes it possible for the user to input requests that are not required to be specified using a predefined set of terms. This makes it easier for users to express what they are interested in using language that they are most comfortable with. Second, the natural language request is likely to not even have any of the predefined words that are syntactically searched for in the query, and the system can still understand the intent of the user and recommend relevant visualizations. This is again in contrast to other approaches that would clearly fail in such instances. This invention enables better recommendations of visualizations and insights while enabling users to leverage their own vocabulary so that they can easily specify exactly what they have in mind rather than relying on having to convert their actual query to another query the system would actually understand (using a common set of terminology that every user must learn).

Moreover, the technology reduces or eliminates the learning curve (which is a costly burden for users due to the time it takes for learning the limited set of vocabulary) with other approaches that require users to have a common set of terminology that must be used to form queries the system can understand. Prior work is only able to support very simple queries that are highly structured and contain predefined words. Another use case is data story authoring where the user can generate data stories, but these systems either do not allow users to edit the recommended data stories or make it extremely difficult and time-consuming to make specific edits, e.g., if a user wants to create another chart manually and add it in-between two other charts to complete a better data story. Using aspects described herein, this is very easy, as the user can simply specify using natural language exactly what should be done, e.g., "Add a chart after the second chart showing the correlation between x and y." This problem is challenging and time-consuming, requiring a lot of manual effort from the user to first create the chart manually and then place it appropriately in the data story. However, aspects herein enable the user to quickly and intuitively perform such data story authoring and editing.

To achieve some of these benefits, the present technology generally relates to generating graphic visualizations from natural language requests. To do so, a natural language model is trained. The natural language model may be pre-trained on a general corpus of data and fine-tuned, or may be trained initially on a specific data corpus. Both aspects describe training the natural language model. During training, including fine-tuning, the natural language model is trained as a dataset that comprises a document corpus having text-based information describing or otherwise corresponding to graphic visualizations. The text-based information may include data attributes of graphic visualizations within the training data.

As noted, some embodiments also use an intent classifier to classify an intent of a natural language request that is further used for determining and generating a graphic visualization. The intent classifier may be trained using supervised learning on a set of labeled intent pairs. The labeled intent pairs are generated to include a text phrase that is in a natural language format. The text phrase is associated with an intent label that identifies the known intent of the text phrase.

Having trained the models, a natural language request is received from a computing device, such as a client-computing device. The natural language request is in a natural language format and is a request for generating a graphic visualization. The natural language request is parsed into a set of n-grams, where each n-gram includes one or more words within the natural language request. One or more of the n-grams can be input to the natural language model, which outputs word embeddings corresponding to the input n-grams.

Data attributes can be discovered based on the word embeddings. The word embeddings are mapped to data-attribute embeddings in an index, e.g., based on a distance between the word embeddings and the data-attribute embeddings to identify semantically similar data-attribute embeddings. The data-attribute embeddings are indexed with an associated data attribute, thus identifying the data attribute from the original natural language request. Beneficially, the system may identify the most semantically similar data attribute(s) to include in the generated graphic visualization, even in cases where the natural language request does not explicitly include the data attribute.

Optionally, in some cases, the user intent is determined from the natural language request. Here, the natural language request is input to the trained intent classifier, which outputs a request intent. The request intent may indicate a graphic visualization type, for example. That is, the intent may be classified as comparative, a request to compare data attributes; temporal, a request to visualize one or more data attributes over time; aggregative, a request to aggregate data values for one or more data attributes; or another like intent label.

In addition to, or in lieu of, using the request intent to determine the graphic visualization type, a graphic visualization type may be identified from a number of data attributes. That is, a natural language request indicating only one data attribute may likely be a temporal request, and thus, a graphic visualization type showing values of the data attribute over time may be selected. Where a natural language request indicates more than one data attribute, it could indicate a graphic visualization type that shows a comparative visualization or aggregate visualization.

Based on determining the graphic visualization type, the graphic visualization can be generated. That is, the graphic visualization may be generated to include the discovered data attribute and generated in a format consistent with the graphic visualization type, e.g., generated in accordance with the graphic visualization type. The generated graphic visualization includes values for the data attribute. One method of generating the graphic visualization is to provide the information to a graphic visualization generation engine that generates graphic visualizations from structured data elements, such as information provided in a JSON format.

In some cases, the graphic visualization may be generated to include graphic visualization attributes, such as color, size, etc. These may be determined from, among other things, a user history, the natural language request, or the graphic visualization type. In a particular example, the word embeddings are used to identify the graphic visualization attributes by comparing the word embeddings to graphic visualization attribute embeddings and, using the embeddings, determining one or more of the most semantically similar graphic visualization attributes.

Advantageously, the technology presented by the above example improves computer and database technology, as it allows greater exploration of data using natural language. As noted, this provides users a way to generate graphic visualizations from the data with a requirement to know the exact data attributes that have been indexed. Further, users may express an intent on what the users wish to portray, and the system may determine the best way to illustrate that information. This can be done even without the user knowing what type of visualization may best represent the data. Such advances depart from conventional methods and improve upon them.

Further, many of these aspects were not well-understood, routine, or conventional activity in the field. As noted, prior graphic visualization generation methods required a user to indicate the exact data attribute and further indicate what graphic visualization type should be used to illustrate the data value of the data attribute. It was not well understood, routine, or conventional to use plain language requests to discover data attributes, as described herein based on the data-attribute embeddings. It was also not well understood, routine, or conventional to have a system that selects a graphic visualization type based on graphic visualization attributes determined based on semantic similarity to a natural language request, as is described herein using graphic visualization attribute embeddings. Such activity departs from the conventional methods previously described and provides advances over such prior technology, allowing for enhanced database exploration along with identifying effective measures of conveying data attribute values beyond that which is or can be explicitly described by a user.

It will be realized that the method previously described is only an example that can be practiced from the description that follows, and it is provided to more easily understand the technology and recognize its benefits. Additional examples are now described with reference to the figures.

Example System for Generating Graphic Visualizations From Natural Language

With reference now to FIG. 1, an example operating environment 100 in which aspects of the technology may be employed is provided. Among other components or engines not shown, operating environment 100 comprises server 102, computing device 104, and database 106, which are communicating via network 108 to graphic visualization generator 110, natural language model training component 126, and classifier training component 128.

It is noted and again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of its components. Other arrangements and elements (e.g., machines, interfaces, functions, orders, and groupings of functions, etc.) can be used in addition to or instead of those shown, and some elements may be omitted altogether.

Further, some of the elements described in relation to FIG. 1, such as those described in relation to graphic visualization generator 110, natural language model training component 126, and classifier training component 128, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory, such as database 106. Moreover, functions of graphic visualization generator 110, natural language model training component 126, and classifier training component 128, among other functions, may be performed by server 102, computing device 104, or any other component, in any combination.

Database 106 generally stores information, including data, computer instructions (e.g., software program instructions, routines, or services), or models used in embodiments of the described technologies. For instance, database 106 may store computer instructions for implementing any of graphic visualization generator 110, natural language model training component 126, or classifier training component 128. Although depicted as a single database component, database 106 may be embodied as one or more databases or may be in the cloud. In aspects, database 106 is representative of a distributed ledger network.

Network 108 may include one or more networks (e.g., public network or virtual private network [VPN]), as shown with network 108. Network 108 may include, without limitation, one or more local area networks (LANs), wide area networks (WANs), or any other communication network or method.

Generally, server 102 is a computing device that implements functional aspects of operating environment 100, such as one or more functions of graphic visualization generator 110 to facilitate generating a graphic visualization using a natural language request received from computing device 104. Server 102 may be used to employ natural language model training component 126 or classifier training component 128, as will be described. One suitable example of a computing device that can be employed as server 102 is described as computing device 900 with respect to FIG. 9. In implementations, server 102 represents a back-end or server-side device.

Computing device 104 is generally a computing device that may be used to receive a natural language request as an input and display a graphic visualization responsive to the input. As with other components of FIG. 1, computing device 104 is intended to represent one or more computing devices. One suitable example of a computing device that can be employed as computing device 104 is described as computing device 900 with respect to FIG. 9.

In implementations, computing device 104 is a client-side or front-end device. In addition to server 102, computing device 104 may also implement functional aspects of operating environment 100, such as one or more functions of graphic visualization generator 110, natural language model training component 126, or classifier training component 128. It will be understood that some implementations of the technology will comprise either a client-side or front-end computing device, a back-end or server-side computing device, or both, executing any combination of functions from graphic visualization generator 110, natural language model training component 126, or classifier training component 128, among other functions.

Graphic visualization generator 110 generally receives a natural language request from computing device 104 and, in response, generates a graphic visualization. In the example illustrated by FIG. 1, to do so, graphic visualization generator 110 employs n-gram generation component 112, embedding determination component 114, request intent determination component 116, data attribute determination component 118, graphic visualization attribute determination component 120, graphic visualization type determination component 122, and graphic visualization generation component 124.

When a natural language request is received by graphic visualization generator 110, n-gram generation component 112 generally parses the natural language request into a set of one or more n-grams. The n-grams include one or more words from the query. Filler words, such as article and the like, may be removed. For instance, these may be removed based on these words being included in an index indicating the word has little significance in determining a graphic visualization, or other like method.

Figure 2:
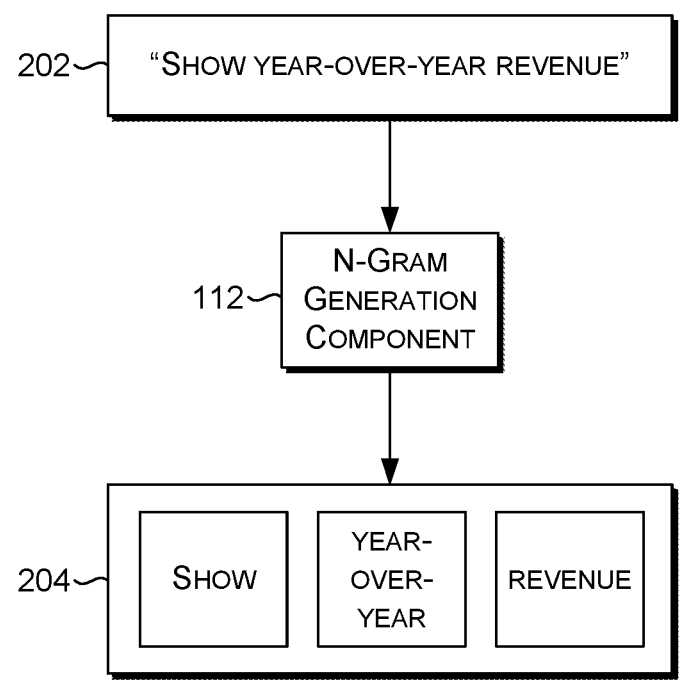
FIG. 2 illustrates an example process for generating n-grams using components of FIG. 1, in accordance with an aspect described herein.

Referring also to FIG. 2, FIG. 2 provides an illustrative example of generating n-grams using an n-gram generation component 112. Here, natural language request 202 is provided as an input to n-gram generation component 112. Responsive to the input natural language request 202, n-gram generation component 112 generates n-grams 204. In this example, n-grams 204 includes three n-grams, including "show," "year-over-year," and "revenue." One or more n-grams in n-grams 204 may be provided as inputs to other components of the system, as will be further described.

Continuing with FIG. 1, embedding determination component 114 may be employed to determine embeddings. This may include, for example, word embeddings, attribute embeddings, and graphic visualization attribute embeddings. To determine the embeddings of inputs, embedding determination component 114 employs natural language model 134, which is trained to receive a textual input and, responsive to the textual input, output an embedding.

In general, natural language model 134 may be a machine learning model suitable to determine relationships between items in a common vector space. At a high level, natural language model 134 may be a neural network or other suitable machine learning model. Some example models include, but are not limited to word2vec, GloVe (Global Vectors for Word Representation), FastText, BERT (Bidirectional Encoder Representations from Transformers), and ELMO (Embeddings from Language Models). In addition to BERT, there are other transformer-based models like GPT (Generative Pre-training Transformer), GPT-2, GPT-3, etc., which can also be used to generate embeddings.

Natural language model training component 126 may be used to train natural language model 134. Natural language model 134 is trained using a first set of training data 140. First set of training data 140 comprises a document corpus having text-based information. The text-based information corresponds to graphic visualizations. For example, the document corpus may include documents having graphs and other like visual elements that convey data and descriptions of the same. The text-based information includes data attributes for the graphic visualizations in the document corpus. Training includes an initial training of natural language model 134 or fine-tuning a pre-trained model to generate the trained natural language model 134.

Having trained natural language model 134 using the first set of training data 140, embedding determination component 114 can use the trained natural language model 134 to determine embeddings. Embedding determination component 114 may be used to determine data-attribute embeddings, graphic visualization attribute embeddings, and word embeddings or other embeddings used by embodiments of the technology.

In an aspect, word embeddings are determined from n-grams generated by n-gram generation component 112. That is, each of one or more n-grams from a set of n-grams is input to natural language model 134 that, in response, outputs one or more corresponding word embeddings. The word embeddings may be used to identify data attributes or graphic visualization attributes for generating a graphic visualization, as will be described.

Figure 3:
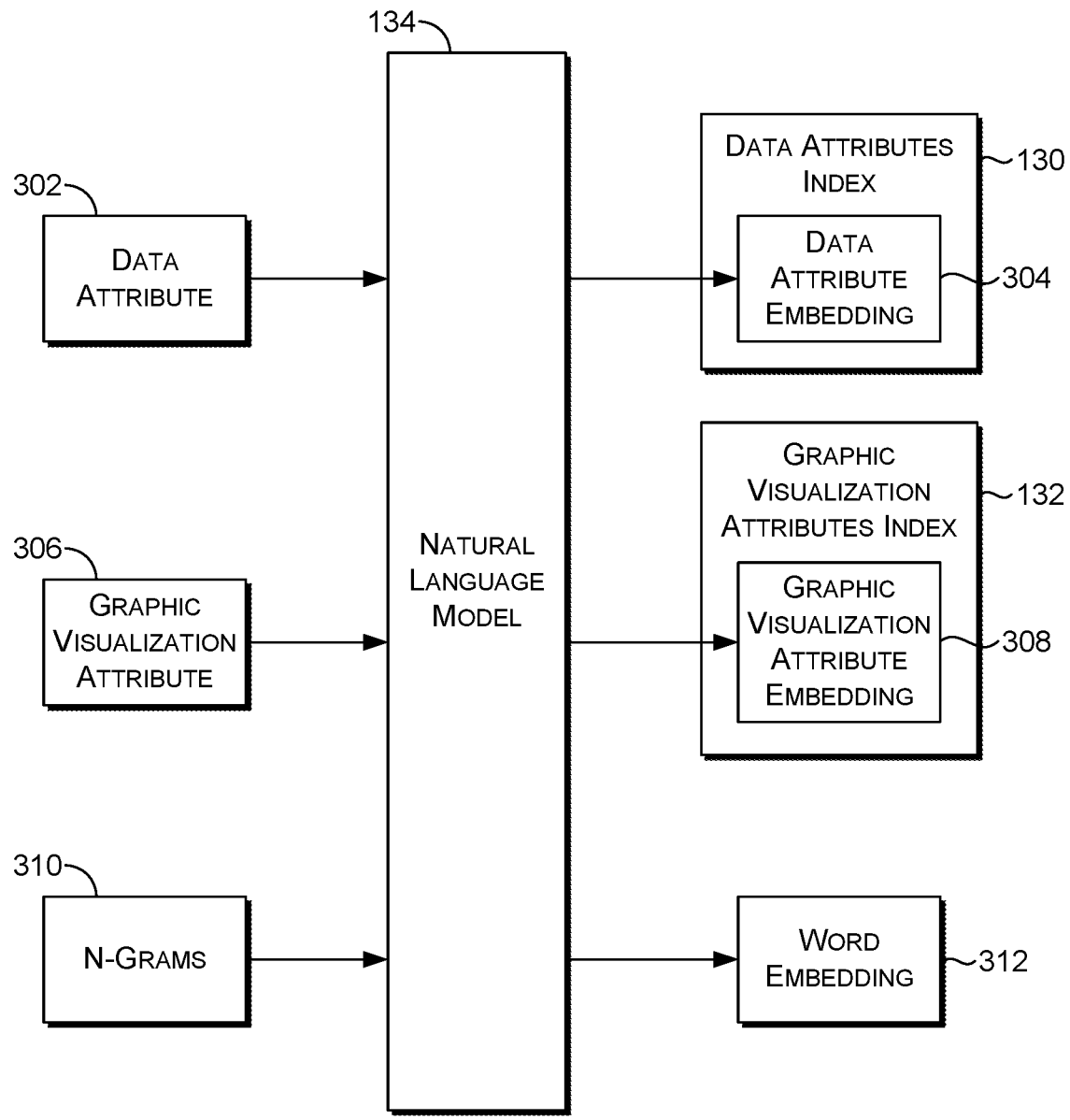
FIG. 3 illustrates an example process for generating embeddings using components of FIG. 1, in accordance with an aspect described herein.

FIG. 3 illustrates an example that uses the trained natural language model 134 to generate embeddings. Here, data attribute 302 is provided to natural language model 134, and in response, natural language model 134 outputs data-attribute embedding 304, which is the embedded representation of data attribute 302. Graphic visualization attributes can also be represented as embeddings for use by components of the systems described herein. Thus, similarly, graphic visualization attribute 306 can be provided as an input to natural language model 134, which in response, outputs graphic visualization attribute embedding 308, which is the embedded representation of graphic visualization attribute 306. As noted, natural language model 134 can also be used to generate word embeddings. To do so, one or more n-grams 310 are provided as inputs to natural language model 134. N-grams 310 is an example set of n-grams that may be generated using n-gram generation component 112. Responsive to the input n-grams 310, natural language model 134 outputs word embeddings 312, which are the embedded representations of n-grams 310. In an aspect, each of data-attribute embedding 304, graphic visualization attribute embedding 308, and word embedding 312 is an embedding in a common vector space that, as will be described, can be used to determine relationships between data attributes, such as data attribute 302; graphic visualization attributes, such as graphic visualization attribute 306; and words within natural language requests, such as those represented by n-grams 310.

With continued reference to FIG. 3 and FIG. 1, the embeddings generated by natural language model 134 may be indexed for use by other system components, such as those in graphic visualization generator 110. As will be described, these indices may be used to determine relationships between word embeddings (which are determined from natural language request), data attributes, and graphic visualization attributes. For example, data attributes and corresponding data-attribute embeddings can be indexed in a data attributes index, such as data attributes index 130 illustrated in FIG. 1 and FIG. 3. That is, the output data-attribute embedding 304 can be indexed to data attributes index 130 and reference the corresponding data attribute 302. In another example, graphic visualization attributes in corresponding graphic visualization attribute embeddings can be indexed in a graphic visualization attributes index, such as graphic visualization attributes index 132. For instance, the output graphic visualization attribute embedding 308 can be indexed to graphic visualization attributes index 132 and reference the corresponding graphic visualization attribute 306. As shown in FIG. 1, data attributes index 130 and graphic visualization attributes index 132 can be saved in database 106 for use by components of graphic visualization generator 110 to determine a data attribute or graphic visualization attribute from a natural language request.

In general, data attributes index 130 may include any combination of various different data attributes, along with their corresponding data values that have been collected and stored. To provide a few examples, in the context of accounting, attributes could include revenue, cost of goods sold, gross profit, operating expenses, other income and expenses, income before taxes, net income, earnings per share, and so forth. In the context of sales attributes, data attributes may include accounting numbers, transaction data, debit or credit amounts, currency, invoice number, number of transactions, payment terms, and so forth. In the context of website analytics attributes, data attributes may include number of visits, visitor identifiers, timestamps, page URLs, session identifiers, device types, browser type, operating system geolocation, duration, click events, conversion events, and so forth. In the context of health information attributes, data attributes may include patient name, patient identifier, date of birth, gender, address, medical record number, admission date, discharge date, diagnosis codes, medications, treatments, vital signs and laboratory results, medical imaging, treating physicians, and so forth. In the context of advertisement campaign attributes, data attributes may include campaign identifier, start and end dates, campaign objective, target audience, target locations, budget, channels, call to action, impressions, clicks, click-through rate, cost-per-click, return on investment, advertisement placement, device type, frequency, bounce rate, time on site, exit pages, and so on. These are just some examples of various data attributes that may be collected and stored in data attributes index 130. The data may be specific to a user or industry, or may be more general. The number of data attributes is vast and it will be understood by those of ordinary skill that there are many data attributes that may be collected and stored.

Data attributes may be collected over a time period. A time period may include a range of time that can be broken into intervals, such as minutes, hours, days, weeks, months, years, and so forth. That is, any of the data values corresponding to a data attribute may be collected at various time intervals and stored within data attributes index 130.

Moreover, graphic visualization attributes index 132 may include any combination of various different graphic visualization attributes. It will be understood that there are many different graphic visualization types that can be customized in a multitude of ways. Thus, there may be many different graphic visualization attributes referenced in graphic visualization attributes index 132. Some examples include attributes related to size, color, font, axis labels or sale, legends, markers, 2-dimensional or 3-dimensional effects, line style, trend lines, shadowing, aspect ratio, background effects, borders, tooltips, and so forth. Each of these may have multiple graphic visualization attributes from which to select when generating a graphic visualization. Moreover, graphic visualization attributes index 132 may store a list of graphic visualization types that can be referenced or identified using methods described herein.

It will be understood that data attributes index 130 and graphic visualization attributes index 132 are provided as examples. Other database structures, including more or fewer indices in any of one or more databases may be used. Data attributes index 130 and graphic visualization attributes index 132 are intended to provide at least one example suitable for use in aspects of the technology.

Referring back to FIG. 1 generally, request intent determination component 116 can be employed by graphic visualization generator 110 to determine an intent, i.e., a request intent, of a natural language request. To do so, request intent determination component 116 employs intent classifier 136 to determine the request intent from a natural language request.

Intent classifier 136 may comprise a machine learning classifier that classifies an input based on its training. Some example classifier models that may be used include, but are not limited to, decision trees, random forest, k-nearest neighbors (KNN), gradient boosting machines (GBM), neural networks, and so forth. One example suitable for use is an MLT (most likely transformations) model.

To determine a request intent, intent classifier 136 is trained by classifier training component 128. One example is to use a supervised training method on a set of labeled data, illustrated here as the second set of training data 142. Second set of training data 142 comprises labeled intent pairs. The labeled intent pairs include a text phrase associated with an intent label that identifies a known intent of the text phrase, e.g., one applied when generating the labeled dataset. For instance, some intent labels may include temporal, denoting a comparison of a data attribute across a time frame; comparative, denoting a comparison of more than one data attribute; aggregative, denoting an aggregation of one or more data attributes; and the like.

As noted, labeled intent pairs can be generated for inclusion in the second set of training data 142. To provide some examples, the text phrase "Show me the number of items sold each year for the last five years" could be labeled as "temporal" since the text phrase is asking for one data attribute and how that changes over time. The text phrase "How does Store A's gross revenue compare to the gross revenue of Store B" could be labeled as "comparative" since the text phrase is asking for two data attributes and how these attributes compare to one another. Further, the text phrase "What is the total net profit of all my stores" could be labeled as "aggregative" since the text phrase is asking for multiple data attributes to be combined to show a total value. Each of these can be generated, labeled, and stored as part of the second set of training data 142 for training intent classifier 136 using classifier training component 128.

Figure 4:
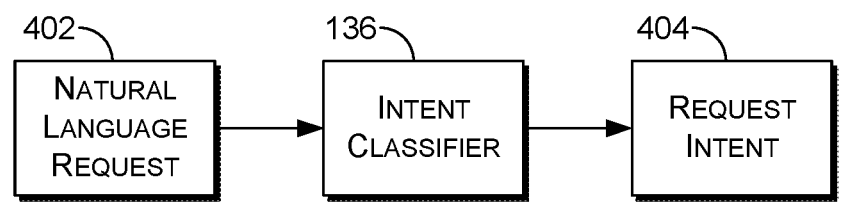
FIG. 4 illustrates an example process for determining a request intent using components of FIG. 1, in accordance with an aspect described herein.

FIG. 4 provides an illustration using the trained intent classifier 136. As illustrated, natural language request 402 is provided as an input to intent classifier 136. Responsive to the natural language request 402 input, intent classifier 136 outputs request intent 404, which is the classified intent for the input corresponding to an intent label on which intent classifier 136 was trained. As will be described, the output request intent 404 may be used to determine a graphic visualization type, a data attribute, a graphic visualization attribute, or other like feature.

With reference back to FIG. 1, data attribute determination component 118 generally determines a data attribute. As noted, the data attribute determined by data attribute determination component 118 can be used to generate a graphic visualization and may be included within the generated graphic visualization.

In an aspect, data attribute determination component 118 determines, e.g., discovers, one or more data attributes from a natural language request. Beneficially, the data attributes determined using data attribute determination component 118 may be determined whether or not the natural language request explicitly describes the data attribute. In the instance that a data attribute is explicitly included within a natural language request, data attribute determination component 118 may simply identify the data attribute from an n-gram generated using n-gram generation component 112. That is, the n-gram comprising the word corresponding to the attribute may be used to directly identify the data attribute within data attributes index 130.

In aspects, data attribute determination component 118 identifies one or more data attributes based on a semantic similarity between n-grams of the natural language request and data attributes referenced in data attributes index 130. To do so, data attribute determination component 118 may map word embeddings determined from embedding determination component 114 to data-attribute embeddings within data attributes index 130. Mapping the embeddings may include mapping the one or more word embeddings to the closest data-attribute embeddings based on a vector similarity between the embeddings. The vector similarity in the common space may be measured, for example, by cosign similarity, Euclidean distance, dot product, and the like.

To determine a graphic visualization attribute, graphic visualization generator 110 can employ graphic visualization attribute determination component 120. In an aspect, graphic visualization attribute determination component 120 determines one or more graphic visualization attributes based on a natural language request. That is, the word embeddings determined from a natural language request by embedding determination component 114 may be used to identify the graphic visualization attributes from graphic visualization attributes index 132. For instance, the word embeddings can be compared based on vector similarity to the graphic visualization attribute embeddings in graphic visualization attributes index 132. One or more word embeddings can be compared to one or more graphic visualization attribute embeddings in graphic visualization attributes index 132 to identify the graphic visualization attribute embeddings (and their corresponding graphic visualization attributes) having the closest similarity in the common vector space. The vector similarity may be measured using methods previously described.

In aspects, graphic visualization attribute determination component 120 determines one or more graphic visualization attributes using user history 138. User history 138 includes user history data, such as past user natural language requests. Past user natural language requests can be recalled from database 106. Like current natural language requests, word embeddings can be determined for the past natural language requests using methods and components previously described. These can be used in addition to the current natural language request to determine one or more graphic visualization attributes.

To select a graphic visualization type, graphic visualization generator 110 may employ graphic visualization type determination component 122. In some cases, the graphic visualization type is determined from the natural language request. For instance, the request may specific a particular graphic visualization type.

In aspects, graphic visualization type determination component 122 selects the graphic visualization type based on the attribute determined from data attribute determination component 118. That is, some values for data values for certain data attributes can be better conveyed on one graphic visualization type than another. These relationships can be determined based on observations of graphic visualizations generally. For instance, a data attribute related to a timestamp may be conveyed on graphic visualization types that include an x-axis, as opposed to heatmaps or other types. As such, graphic visualization types can be initially identified and tagged with indicators for particular data attributes. Based on the tags, the graphic visualization types for a data attribute determined by data attribute determination component 118 can be identified and selected. In some cases, graphic visualization type determination component 122 selects a subset of graphic visualization types from a plurality of graphic visualization types based on the attributes, and other methods, as will be described, for selecting the graphic visualization type.

In aspects, the graphic visualization type is selected by graphic visualization type determination component 122 from a number of data-attribute embeddings identified using data attribute determination component 118, i.e., a number of data attributes that are determined responsive to a natural language request. For instance, if one data attribute is determined, graphic visualization types that are used to compare or aggregate multiple data attributes, such as a pie chart, may not be selected. Instead, a scatter plot may be selected to show the different data values for the single data attribute. In an embodiment, the number of data-attribute embeddings determined, i.e., the number of data attributes, is used to select a subset of graphic visualization types from a plurality of graphic visualization types. Other methods for selecting the type, as described herein, may be used on the subset of graphic visualization types to select a graphic visualization type that will be used when generating a graphic visualization. In an example, the graphic visualization types are initially tagged to indicate a number of data attributes for which the graphic visualization type may intuitively convey. The tags may be used to identify the graphic visualization type or the subset of graphic visualization types from the number of data attributes determined using data attribute determination component 118.

In an aspect, graphic visualization type determination component 122 selects the type based on a temporal element included within the natural language request. A temporal element can be a word or phrase that indicates a time interval, such as a second, minute, hour, day, week, month, year, and the like. That is, some graphic visualization types are better suited than others for conveying data attribute values over a timeframe. These graphic visualization types can be initially identified and tagged to indicate the graphic visualization type is suitable for conveying temporal data. For example, a bar graph or line graph may be better at temporally conveying data attribute values than a pie chart. As such, when a temporal element is included in the natural language request, graphic visualization type determination component 122 determines a graphic visualization type based on the presence of the temporal element using the tags. In an aspect, graphic visualization type determination component 122 determines a subset of graphic visualization types based on the tags.

In an aspect, graphic visualization type determination component 122 selects the graphic visualization type based on user history 138. That is, user history 138 comprises user history data that may include data indicating past graphic visualization types, such as graphic visualization types corresponding to graphic visualizations generated from past natural language requests.

Any combination of the temporal element, number of data attributes, and use history may be used by graphic visualization type determination component 122 when selecting the graphic visualization type. The temporal element may be used in lieu of or in addition to determining the graphic visualization type based on the number of data-attribute embeddings, as previously described. For instance, based on the temporal element, graphic visualization type determination component 122 may select a graphic visualization type from the subset determined based on the number of data-attribute embeddings, or vice versa. Put another way, graphic visualization type determination component 122 may determine the graphic visualization type based on a temporal element in the natural language request, a number of data-attribute embeddings determined using data attribute determination component 118, user history 138, or any combination thereof, and further in combination with other methods described herein or that may be used.

In addition to or in lieu of methods for selecting the graphic visualization type using graphic visualization type determination component 122, the graphic visualization type may be selected based on user intent. As noted, the user intent can be determined from a natural language request using request intent determination component 116. The intent determined, i.e., classified, using request intent determination component 116 relates to labels provided in the data on which intent classifier 136 is trained. These labels may correspond to graphic visualization types. That is, graphic visualization types may be initially tagged with the same labels, e.g., a graphic visualization type corresponding to a temporal display of data values, a graphic visualization type corresponding to a comparative display of data values, a graphic visualization type corresponding to an aggregative display of data values, and so forth for any predetermined label. Using the classification determined by request intent determination component 116, the graphic visualization type can be selected. In an aspect, the graphic visualization type is selected from a subset of graphic visualization types determined using methods previously described.

Graphic visualization generator 110 employs graphic visualization generation component 124 to generate a graphic visualization. The graphic visualization may be generated to display one or more data attributes, one or more graphic visualization attributes, or any combination thereof, and in accordance with the graphic visualization type. As an example, if the graphic visualization type selected is a pie chart, a pie chart may be generated to show the data attribute values within the chart, and may have any graphic visualization attributes, such as color, etc., that have been identified.

In an example, graphic visualization generation component 124 receives information for generating the graphic visualization using a structured data element. That is, the data, such as the graphic visualization type, data attributes, and graphic visualization attributes, can be put in a standard format according to the structured data element and communicated to a generator for generating the graphic visualization. As noted, some formats may include JSON, XML, CSV, or other like structured data elements for communicating or conveying structured. One example generator that may be used to generate the graphic visualization is Vega-Lite or Vega, which are JSON-based.

Figure 5:
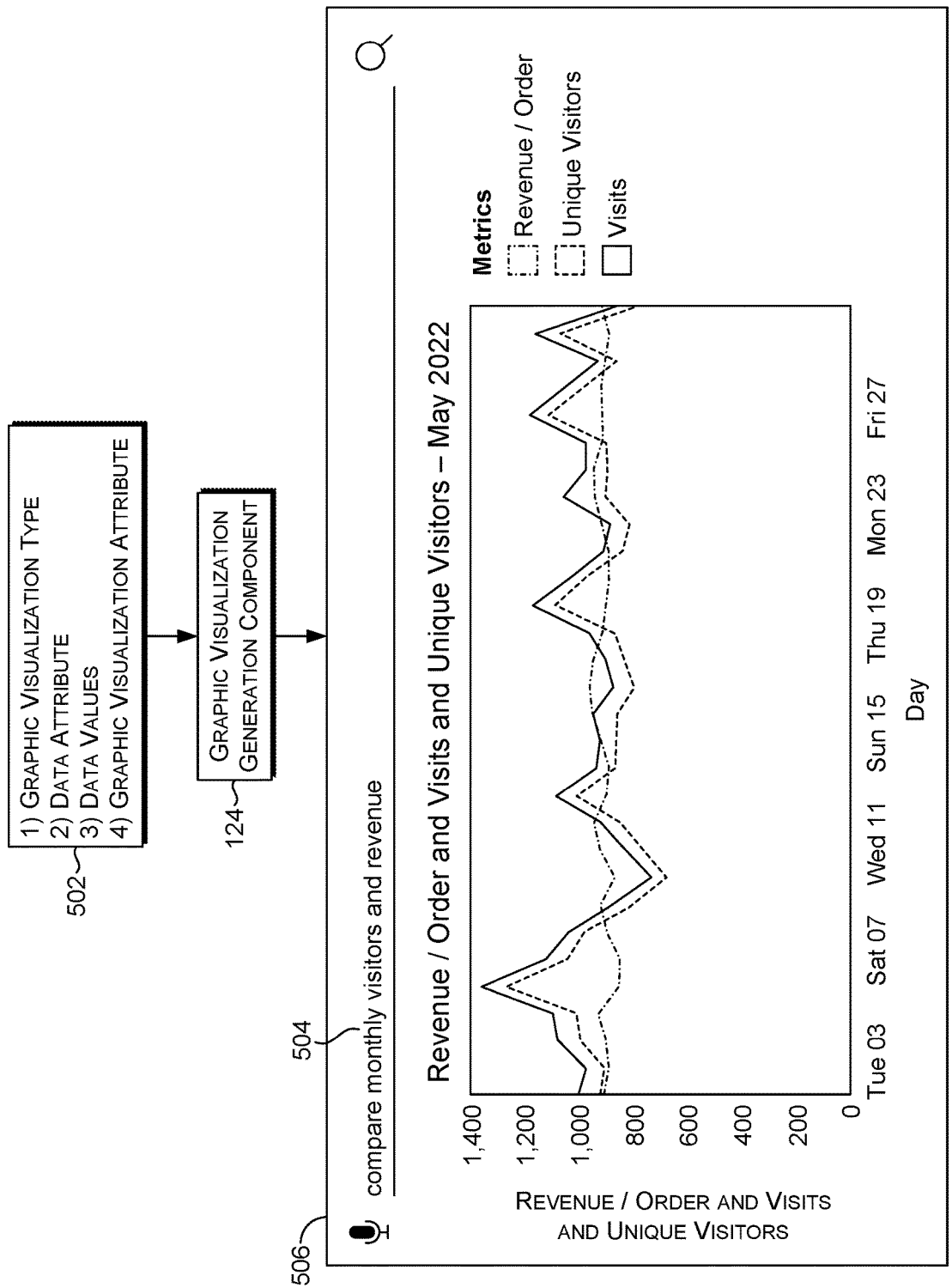
FIG. 5 illustrates an example process for generating a graphic visualization using components of FIG. 1, in accordance with an aspect described herein.

FIG. 5 illustrates an example using graphic visualization generation component 124 for generating a graphic visualization. Here, structured data element 502 comprises a graphic visualization type, data attribute, data values corresponding to the data attribute, and a graphic visualization attribute. It is noted that this is just an example, and any combination of data may be included, including more or fewer data than that illustrated within structured data element 502.

In this particular example, the data within structured data element 502 is determined for natural language request 504. Structured data element 502 is communicated to a graphic visualization generator, which may be included as part of graphic visualization generation component 124. In an aspect, the graphic visualization generator is a disparate component, and graphic visualization generation component 124 communicates structured data element 502 to the graphic visualization generator. In response, graphic visualization generation component 124 outputs or receives graphic visualization 506, displaying the data attribute or corresponding data attribute values and any graphic visualization attributes in accordance with the graphic visualization type.

Example Method of Generating a Graphic Visualization Using Graphic Visualization Generator 110

Given a natural language request $q=(w\_1, w\_2, \ldots, w\_n)$, an overview that can be performed by graphic visualization generator 110 is as follows: the natural language model f is trained using natural language model training component 126. In another aspect, f is an existing pre-trained language model that is loaded and has been fine-tuned for visualization-based NLIs (national language interfaces).

A large corpus of visualization documents (visualization papers, visualization library documentation, previous user queries, and so on) can be used to teach the natural language model, or to bias the learning of the natural language model while also keeping it flexible and general for the layperson. The documents are incorporated into the corpus used for teaching the language model f. The proposed system is not dependent on the actual language model and can always use the current state-of-the-art model to train the function f. Further, instead of using a single word, n-grams of the words can be used.

A classifier is taught to automatically predict the task of interest to a user, i.e., the request intent. To do this, a model is trained using a training dataset of a natural language request to task (i.e., intent) pairs. This can be done using classifier training component 128.

Then a new input from a user is obtained, e.g., the natural language request, and the model is used to infer the appropriate task in real-time. Note that by inferring the task, the appropriate graphic visualization type and other properties related to the intent of the natural language request are determined, which help inform other components of the system.

The language model f is used to obtain the word embeddings for each word $w\_i$ lin q in the natural language request q, hence, $(z\_1, z\_2, \ldots)$ where $z\_i$ is the embedding of word $w\_i$ from the user query q. The word embeddings can be determined using n-gram generation component 112 and embedding determination component 114.

Relevant terms are extracted and mapped to the relevant terms in the natural language request to the appropriate visualization-specific concepts, including the analytic task, e.g., the request intent (e.g., filtering, comparison, correlation, temporal, aggregative, etc.), along with data attributes and graphic visualization attributes. For instance, the data attributes can be determined using data attribute determination component 118, and the graphic visualization attributes can be determined using graphic visualization attribute determination component 120.

Let $I=\{i\_1, i\_2, \ldots\}$ denote the base set of insights/tasks (e.g., the request intent) and $C=\{c\_1, c\_2, \ldots\}$ denote the set of chart types. I, e.g., the request intent, can be determined using request intent determination component 116. These sets represent the words typically used for each, which are mapped internally to specific actions that will be combined to create an entire visualization based on the partial or noisy user specifications, e.g., $c\_2$ may indicate a bar chart and so on. Further, the set of data attribute names is $A=\{a\_1, a\_2, \ldots\}$ for the dataset of interest to the current user based on the natural language request, and for every categorical data attribute in the dataset. The set of unique data attribute values (e.g., if there is a "city" attribute in the user dataset, then {"Atlanta," . . . "San Jose," "Seattle," . . . }) is determined.

The language model f is used to obtain the word embedding vectors for each word $w\_i$ in the natural language request q, hence, $(z\_1, z\_2, \ldots)$ where $z\_i$ is the embedding of word $w\_i$ from q. The word embeddings may be determined using embedding determination component 114. Given a word $w\_i$ in the query q, $I=\{i\_1, i\_2, \ldots\}$, chart type $C=\{c\_1, c\_2, \ldots\}$, and data attribute names $A=\{a\_1, a\_2, \ldots\}$ are known from request intent determination component 116, data attribute determination component 118, and graphic visualization type determination component 122. These are used mainly internally by the system, but it is not assumed to have an exact or even approximate matches between the terms in the query and items in the set. However, if this is the case, then it is assigned, and the method continues. Using the embeddings, attributes with the largest likelihood are selected. This is done using the similarity of the embedding of $w\_i$, and each of the words $W\_v=I\bigcup C\bigcup\cdots\bigcup A$, and if $w\_i$ is most similar to some word $w^*\in I$, then it is associated with being the request intent. However, if there is another word $w\_j$ in the natural language request that has a larger likelihood, and the associate set can only be associated with one such word from the natural language request, then the one with the largest likelihood is selected. In this way, the likelihood/probability of word $w\_i$ being associated with each of the word intent types is stored. This gives us a probability of $w\_i$ for insight, chart type, attribute name, and so on. Once this is done for each word in the natural language request, each word is iterated through and is assigned (insight, attribute name, chart type, color, etc.) with the largest likelihood.

After a word $w\_i$ or natural language request is assigned to a specific intent, attribute, etc., in many cases, another word may not be assigned to that same intent or attribute (e.g., data attribute, graphic or visualization attribute). One such example is if $w\_i$ has the largest probability of being about the chart type of the visualization warranted by the natural language request, then other words in the user's natural language request are likely about the chart type. However, other user intents or attributes, such as color, size, or attribute names may be associated with multiple words in the user query. Once the most likely words from natural language request q are mapped to the different attributes, intent, graphic visualization type, etc., then these are used to obtain the most relevant set of visualizations (ranked by likelihood). These may be displayed for selection by the user. Graphic visualization generation component 124 may be used to generate the graphic visualization.

The system proposed can recommend relevant graphic visualizations to users, even when the natural language request does not contain any of the manually defined terms that previous systems required. This provides the user with the flexibility to express their idea or goal/intent using terminology that they are most familiar with, while avoiding steps that other systems would require, such as to first map their query into the small set of terminology the system can actually understand. Using the system provided herein, a natural language model captures the context in the sequence of words from the user's natural language request, while a classifier captures intent. The model can be trained with previous user queries where the different aspects of the query (such as the chart type, intent/insight, and so on) have been identified and labeled. In this way, the full sequence of words in the natural language request is leveraged to best identify each part, which may ultimately lead to better graphic visualizations being recommended to the user. Furthermore, the system can also naturally use spoken/voice queries, which can be translated to a sequence of words of a natural language request, and then use the above approach just as before.

Figure 6:
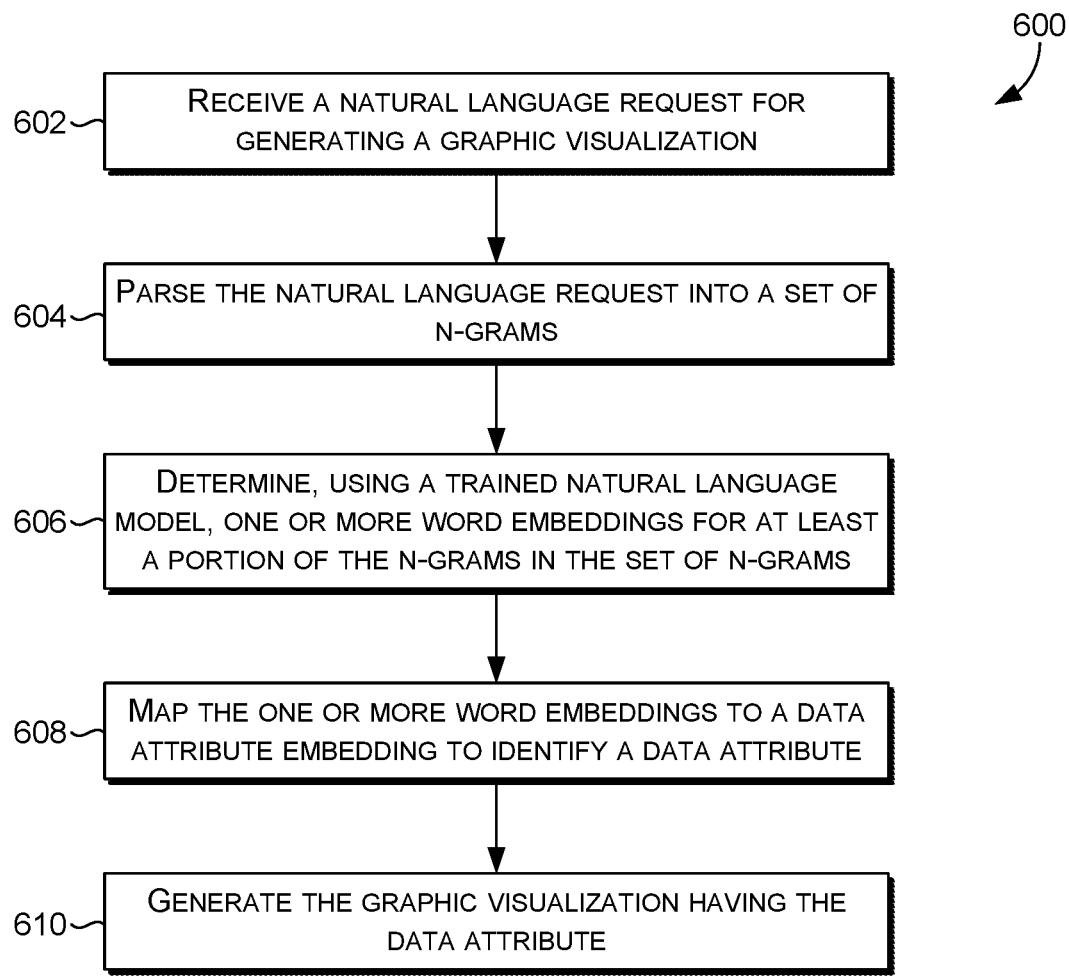
FIGS. 6-8 illustrate flow diagrams of example methods for generating graphic visualizations, in accordance with aspects described herein.
Figure 7:
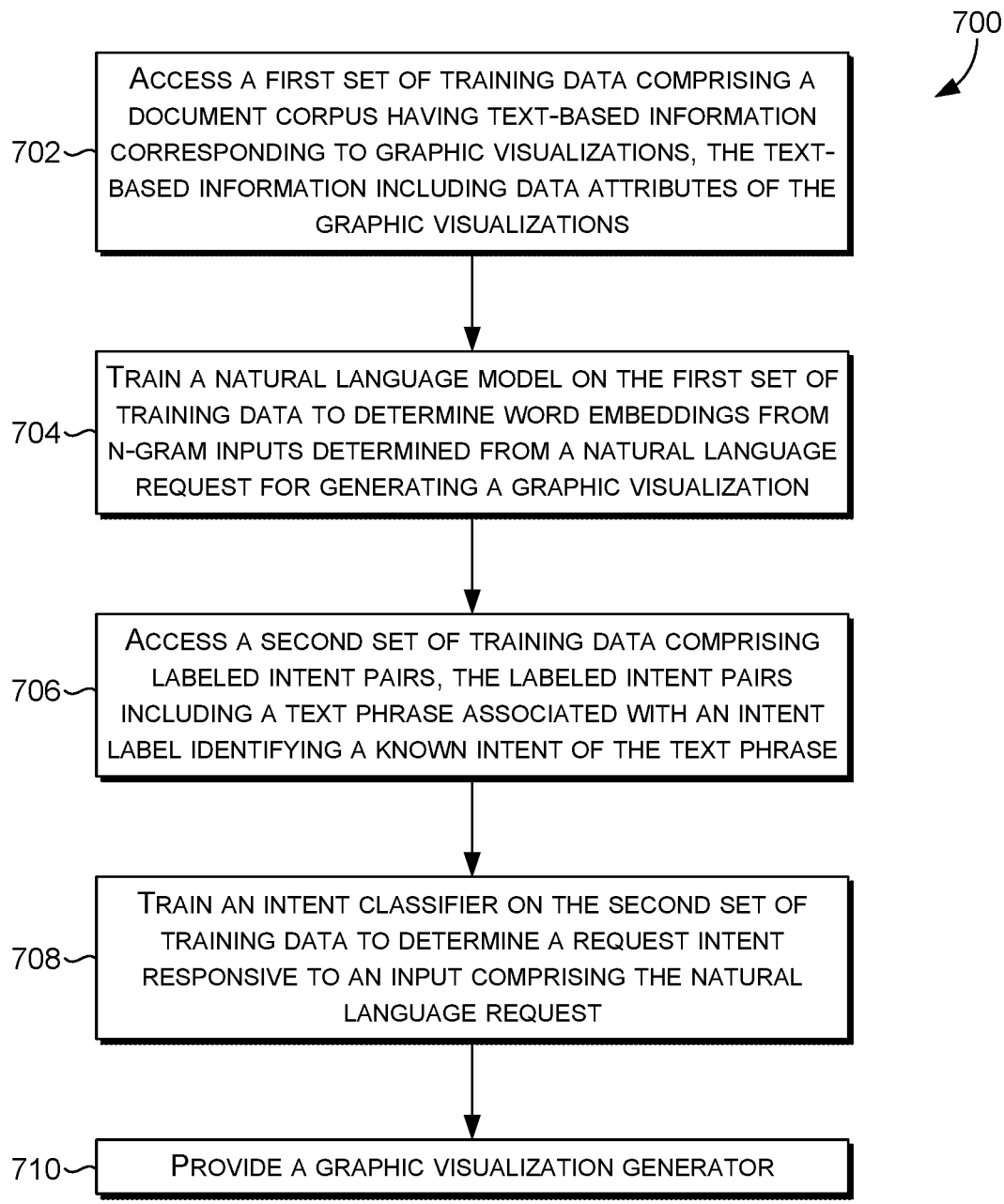
Figure 8:
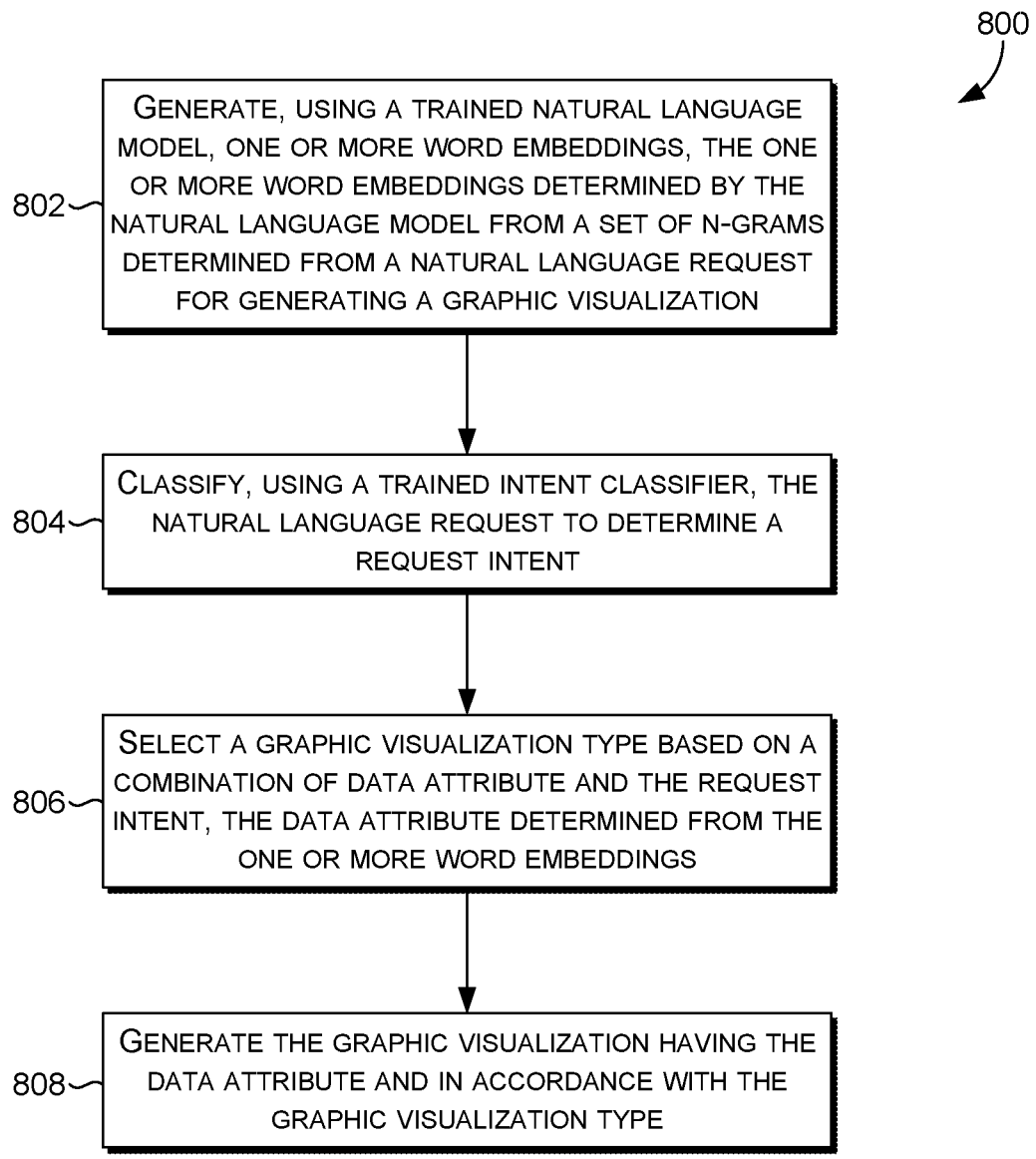

Additional Example Methods for Generating Graphic Visualization Using Graphic Visualization Generator 110, as Illustrated by FIGS. 6-8

With reference to FIGS. 6-8, block diagrams are provided respectively illustrating methods 600, 700, and 800 for generating graphic visualization. Each block of methods 600, 700, and 800 may comprise a computing process performed using any combination of hardware, firmware, or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few possibilities. Methods 600, 700, and 800 may be implemented in whole or in part by components of operating environment 100, such as graphic visualization generator 110.

Referring initially to FIG. 6, an example method for generating a graphic visualization is provided. At block 602, a natural language request is received. This may be received from a computing device, such as computing device 104. The natural language request may be a text-based request in natural language and be a request for generating a graphic visualization.

At block 604, the natural language request is parsed into a set of n-grams. This may be done using n-gram generation component 112. In aspects, one or more n-grams may be removed from the set, such as articles or other like terms that are not indicative of attributes for graphic visualization generation.

At block 606, word embeddings are determined from the n-grams. This may be done by employing embedding determination component 114. Embedding determination component 114 may employ natural language model 134 to determine the word embeddings. A word embedding may be determined for each remaining n-gram or all of the n-grams generated at block 604. That is, word embeddings may be determined for at least a portion of the n-grams.

At block 608, the word embeddings determined at block 606 are mapped to data attribute-embeddings. This may be done using data attribute determination component 118. In an example, each word embedding is mapped to a data-attribute embedding based on the vector similarity in a common vector space. One or more data attributes are determined by mapping the word embeddings to the data-attribute embeddings corresponding to the data attributes.

At block 610, a graphic visualization is generated to have the data attributes, e.g., data values thereof, determined at block 608. This may be done using graphic visualization generation component 124. In some cases, a structured data element is generated and used as an input for a generator to generate the graphic visualization. The structured data element may include graphic visualization information in a data format specific to the structured data element. For instance, the structured data element can comprise the graphic visualization type, graphic visualization attributes, data attributes, data attribute values, and other like information for generating a graphic visualization, or any combination thereof.

In aspects, the graphic visualization is generated in accordance with a graphic visualization type. This may be done using graphic visualization generation component 124. That is, if a graphic visualization type is identified or otherwise determined as described herein, the generated graphic visualization may conform to the type. For example, if the graphic visualization type is identified as a bar graph, then graphic visualization generation component 124 generates a bar graph that visually represents the data attribute values of the data attributes.

In aspects, the graphic visualization type is determined based on using a classifier to classify the natural language request. For example, graphic visualization type determination component 122 can employ intent classifier 136 to determine a request intent from the natural language request, and the graphic visualization type is based on the request intent. In some aspects, the graphic visualization type is determined based on a number of data-attribute embeddings, i.e., the number of data attributes, to be included in the graphic visualization, as determined by data attribute determination component 118. In some cases, the graphic visualization type is determined based on user history. The graphic visualization type may also be determined based on a temporal element included within the natural language request.

In aspects, the graphic visualization is generated at block 610 to have a graphic visualization attribute. A graphic visualization attribute may be determined using graphic visualization attribute determination component 120. For example, the graphic visualization attribute may be determined based on user history, e.g., by identifying graphic visualization attributes that have been included in previous generated graphic visualizations for the user. Graphic visualization attributes may also be determined by mapping the word embeddings to graphic visualization attribute embeddings.

Turning now to FIG. 7, an example method 700 is provided for training models suitable for facilitating graphic visualization generator 110 by a graphic visualization generation component.

At block 702, a first set of training data is accessed for training a natural language model. The first set of training data comprises a document corpus having text-based information. The first dataset comprises a document corpus having text-based information. The text-based information corresponds to graphic visualizations and includes data attributes of the graphic visualizations. In aspects, documents of the document corpus are labeled, e.g., tagged to identify data attributes and graphic visualization attributes.

At block 704, a natural language model is trained. Natural language model training component 126 can be used to train the model. The model is trained on a first data set. The model may be initially trained or may be fine-tuned from a pre-trained model during training. The method may include an unsupervised training method on the document corpus. In aspects, labeled documents may be used during a supervised training method to train or fine-tune the natural language model.

At block 706, a second set of training data is accessed for training an intent classifier. The second set of training data comprises labeled intent pairs. The labeled intent pairs include a text phrase associated with an intent label (e.g., task label) that identifies a known intent of the text phrase.

At block 708, the intent classifier is trained on the second set of training data. This may be done using classifier training component 128. Based on the training, the intent classifier receives a natural language request and classifies it to output an intent.

At block 710, a graphic visualization generation component is provided. The graphic visualization generation component is suitable for generation graphic visualizations. The graphic visualization generation component is configured to receive a graphic visualization type. The graphic visualization type may be selected at least in part based on a data attribute. This may further include selecting the graphic visualization type based on a temporal element within the natural language request, the user history, or a number of data attributes, or any combination thereof. The graphic visualization type may also be determined based on a request intent of a natural language request, as determined from the intent classifier trained at block 708. The data attribute is determined from word embeddings from the natural language request, as determined from the natural language model. The graphic visualization generation component is further configured to generate the graphic visualization having the data attribute and in accordance with the graphic visualization type. The graphic visualization generation component may generate the graphic visualization using a structured data element. For instance, graphic visualization information may be included in the structured data element and may be provided to a generator as described.

In aspects, the graphic visualization generation component is further configured to map the word embeddings from n-grams of the natural language request to data-attribute embeddings to determine the data attribute.

In aspects, the graphic visualization is generated to include a graphic visualization attribute. This may be determined by mapping the word embeddings to graphic visualization attribute embeddings. In some aspects, the graphic visualization attribute is determined based on a user history.

Referring now to FIG. 8, the figure provides an example method 800 for generating a graphic visualization. At block 802, one or more word embeddings are generated from a natural language request. For instance, n-gram generation component 112 may be used to determine n-grams from the natural language request, and embedding determination component 114 may be used to determine the word embeddings from at least a portion of the n-grams. A natural language model may be used to generate the word embeddings from the n-grams.

In aspects, a data attribute may be determined from the n-grams using data attribute determination component 118. This can be done by mapping the word embeddings to corresponding data-attribute embeddings. In some cases, the data attribute may be further based on a user history.

At block 804, the natural language request is classified by a trained intent classifier to determine a request intent.

At block 806, a graphic visualization type is selected. The type is selected based at least on the request intent. The type may be selected based further on the data attribute determined from the word embedding, a temporal element in the natural language request, a number of data attributes (i.e., a number of data-attribute embeddings) or user history, or any combination thereof. In an aspect, the word embeddings are mapped to graphic visualization attribute embeddings corresponding to graphic visualization attributes, and the type is based on the determined graphic visualization attributes.

At block 808, the graphic visualization is generated. The graphic visualization may be generated by graphic visualization generation component 124 based on a structured data element comprising graphic visualization information. The graphic visualization may be generated to include the attribute, including data attribute values, and any graphic visualization attributes, and is generated in accordance with the graphic visualization type selected at block 806.

Example Operating Environment

Having described an overview of some embodiments of the present technology, an example computing environment in which embodiments of the present technology may be implemented is described below in order to provide a general context for various aspects of the present technology. Referring now to FIG. 9 in particular, an example operating environment for implementing embodiments of the present technology is shown and designated generally as computing device 900. Computing device 900 is but one example of a suitable computing environment and is not intended to suggest any limitation as to the scope of use or functionality of the technology. Computing device 900 should not be interpreted as having any dependency or requirement relating to any one or combination of components illustrated.

The technology may be described in the general context of computer code or machine-useable instructions, including computer-executable instructions, such as program modules, being executed by a computer or other machine, such as a cellular telephone, personal data assistant, or other handheld device. Generally, program modules, including routines, programs, objects, components, data structures, etc., refer to code that performs particular tasks or implements particular abstract data types. The technology may be practiced in a variety of system configurations, including handheld devices, consumer electronics, general-purpose computers, more specialty computing devices, etc. The technology may also be practiced in distributed computing environments where tasks are performed by remote-processing devices that are linked through a communications network.

With reference to FIG. 9, computing device 900 includes bus 910, which directly or indirectly couples the following devices: memory 912, one or more processors 914, one or more presentation components 916, input/output (I/O) ports 918, input/output components 920, and illustrative power supply 922. Bus 910 represents what may be one or more buses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. The inventors recognize that such is the nature of the art, and reiterate that the diagram of FIG. 9 is merely illustrative of an example computing device that can be used in connection with one or more embodiments of the present technology. Distinction is not made between such categories as "workstation," "server," "laptop," "handheld device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and non-volatile media, and removable and non-removable media. By way of example, and not limitation, computer-readable media may comprise computer storage media and communication media. Computer storage media, also referred to as a communication component, includes both volatile and non-volatile, removable and non-removable media implemented in any method or technology for storage of information, such as computer-readable instructions, data structures, program modules, or other data. Computer storage media includes, but is not limited to, RAM, ROM, EEPROM, flash memory, or other memory technology; CD-ROM, digital versatile disks (DVDs), or other optical disk storage; magnetic cassettes, magnetic tape, magnetic disk storage, or other magnetic storage devices; or any other medium that can be used to store the desired information and that can be accessed by computing device 900. Computer storage media does not comprise signals per se.

Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 912 includes computer-storage media in the form of volatile or non-volatile memory. The memory may be removable, non-removable, or a combination thereof. Example hardware devices include solid-state memory, hard drives, optical-disc drives, etc. Computing device 900 includes one or more processors that read data from various entities, such as memory 912 or I/O components 920. Presentation component(s) 916 presents data indications to a user or other device. Example presentation components include a display device, speaker, printing component, vibrating component, etc.

I/O ports 918 allow computing device 900 to be logically coupled to other devices, including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition, both on screen and adjacent to the screen, as well as air gestures, head and eye tracking, or touch recognition associated with a display of computing device 900. Computing device 900 may be equipped with depth cameras, such as stereoscopic camera systems, infrared camera systems, RGB (red-green-blue) camera systems, touchscreen technology, other like systems, or combinations of these, for gesture detection and recognition. Additionally, the computing device 900 may be equipped with accelerometers or gyroscopes that enable detection of motion. The output of the accelerometers or gyroscopes may be provided to the display of computing device 900 to render immersive augmented reality or virtual reality.

At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions includes any software, including low-level software written in machine code; higher-level software, such as application software; and any combination thereof. In this regard, components for generating graphic visualizations can manage resources and provide the described functionality. Any other variations and combinations thereof are contemplated within embodiments of the present technology.

Referring to the drawings and description in general, having identified various components in the present disclosure, it should be understood that any number of components and arrangements might be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, or software. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including," "having," and other like words and their derivatives have the same broad meaning as the word "comprising," and the word "accessing" comprises "receiving," "referencing," or "retrieving," or derivatives thereof. Further, the word "communicating" has the same broad meaning as the word "receiving" or "transmitting," as facilitated by software or hardware-based buses, receivers, or transmitters using communication media described herein.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment. However, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated by the accompanying drawings is to be interpreted as illustrative and not in a limiting sense.

What is claimed is:

1. A system comprising:
   at least one processor; and
   one or more computer storage media storing computer-readable instructions thereon that when executed by the at least one processor cause the at least one processor to perform operations comprising:
   receiving, by a graphic visualization generator, a natural language request for generating a graphic visualization;
   parsing, by an n-gram generation component, the natural language request into a set of n-grams;
   determining, using a trained natural language model, one or more word embeddings for at least a portion of the n-grams in the set of n-grams;
   mapping, by a data attribute determination component, the one or more word embeddings to a data-attribute embedding to identify a data attribute;
   selecting a graphic visualization type based on a number of data-attribute embeddings mapped to the one or more word embeddings;
   forming a standard format data structure using the graphic visualization type and data attribute as structured data elements; and
   generating, by a graphic visualization generation component using the standard format data structure, the graphic visualization according to the graphic visualization type and having the data attribute.

2. The system of claim 1, further comprising:
   classifying, using a trained intent classifier, the natural language request to determine a request intent; and
   selecting a graphic visualization type based on a combination of the data attribute and the request intent, wherein the graphic visualization is generated in accordance with the graphic visualization type.

3. The system of claim 1, further comprising determining a graphic visualization type based on a temporal element included within the natural language request, and wherein the graphic visualization is generated in accordance with the graphic visualization type.

4. The system of claim 1, further comprising determining a graphic visualization attribute from user history data, wherein the graphic visualization is generated to include the graphic visualization attribute.

5. The system of claim 1, further comprising mapping the one or more word embeddings to one or more graphic visualization attribute embeddings to identify a graphic visualization attribute, wherein the graphic visualization is generated to include the graphic visualization attribute.

6. A computerized method performed by one or more processors, the method comprising:
   accessing, by a natural language model training component, a first set of training data comprising a document corpus having text-based information corresponding to graphic visualizations, the text-based information including data attributes of the graphic visualizations;
   training, by the natural language model training component, a natural language model on the first set of training data to determine word embeddings from n-gram inputs determined from a natural language request for generating a graphic visualization;
   accessing, by a classifier training component, a second set of training data comprising labeled intent pairs, the labeled intent pairs including a text phrase associated with an intent label identifying a known intent of the text phrase;
   training, by the classifier training component, an intent classifier on the second set of training data to determine a request intent responsive to an input comprising the natural language request; and
   providing a graphic visualization generation component, the graphic visualization generator configured to:
      receive a graphic visualization type selected based on a number of data-attribute embeddings mapped to the word embeddings output from the trained natural language model and from the request intent output from the trained intent classifier; and
      generate a graphic visualization having a data attribute corresponding to the data-attribute embedding and in accordance with the graphic visualization type, the graphic visualization generated from a standard format structure using the having the graphic visualization type and the data attribute as structured data elements.

7. The method of claim 6, wherein the graphic visualization generation component is further configured to map the word embeddings from the n-gram inputs to determine the data-attribute embedding.

8. The method of claim 6, wherein the graphic visualization type is further selected by the graphic visualization generation component based on a temporal element included within the natural language request.

9. The method of claim 6, wherein the graphic visualization generation component is further configured to:
   determine a graphic visualization attribute from user history data; and
   generate the graphic visualization to include the graphic visualization attribute.

10. The method of claim 6, wherein the graphic visualization generation component is further configured to:
    map the word embeddings to a graphic visualization attribute embedding to identify a graphic visualization attribute; and
    generate the graphic visualization to include the graphic visualization attribute.

11. One or more computer storage media storing computer-readable instructions thereon that, when executed by a processor, cause the processor to perform a method comprising:
    generating, using a trained natural language model, one or more word embeddings, the one or more word embeddings determined by the natural language model from a set of n-grams determined from a natural language request for generating a graphic visualization;
    classifying, using a trained intent classifier, the natural language request to determine a request intent;
    selecting a graphic visualization type based on a combination of a data attribute, a number of data attribute embeddings mapped to the one or more word embeddings, and the request intent, the data attribute determined from the one or more word embeddings; and
    generating the graphic visualization having the data attribute and in accordance with the graphic visualization type, the graphic visualization generated from a standard format data structure having the data attribute and the graphic visualization type as structured data elements.

12. The media of claim 11, further comprising mapping the one or more word embeddings to a data-attribute embedding to identify the data attribute.

13. The media of claim 11, wherein the graphic visualization type is further selected based on a temporal element included within the natural language request.

14. The media of claim 11, further comprising determining a graphic visualization attribute from user history data, wherein the graphic visualization is generated to include the graphic visualization attribute.

15. The media of claim 11, further comprising mapping the one or more word embeddings to one or more graphic visualization attribute embeddings to identify a graphic visualization attribute, wherein the graphic visualization is generated to include the graphic visualization attribute.

* * * * *